United States Patent [19]

Marschner

[11] Patent Number: 4,981,346

[45] Date of Patent: Jan. 1, 1991

[54] COLLAPSIBLE PORTABLE PERISCOPE

[75] Inventor: Charles F. Marschner, Longwood, Fla.

[73] Assignee: McCalla-Lackey Associates, Inc., Norcross, Ga.

[21] Appl. No.: 273,065

[22] Filed: Nov. 17, 1988

[51] Int. Cl.$^5$ .................. G02B 23/08; G02B 23/20
[52] U.S. Cl. .................................. 350/540; 350/618
[58] Field of Search .............. 350/618, 540, 541, 542, 350/543, 544, 546, 140

[56] References Cited

U.S. PATENT DOCUMENTS

| 2,155,164 | 4/1939 | Harris | 350/618 |
| 2,364,670 | 12/1944 | Stamy et al. | 350/618 |
| 2,381,909 | 8/1945 | Hosted | 350/618 |
| 2,635,506 | 4/1953 | Chaimson | 350/618 |
| 3,014,408 | 12/1961 | Miller | 350/618 |
| 3,357,777 | 12/1967 | Kallio | 350/618 |
| 4,550,978 | 11/1985 | Friedle | 350/618 |

FOREIGN PATENT DOCUMENTS

| 1175538 | 11/1958 | France | 350/618 |
| 0000110 | of 1915 | United Kingdom | 350/618 |
| 0004772 | 3/1916 | United Kingdom | 350/618 |

Primary Examiner—Bruce Y. Arnold
Assistant Examiner—Martin Lerner
Attorney, Agent, or Firm—Needle & Rosenberg

[57] ABSTRACT

A portable periscope has a body divided by longitudinal and transverse fold lines. The body can be folded inwardly along the longitudinal fold lines to produce an erect periscope frame having a rectangular cross section. End flaps on either end of the frame hold mirrors which are inclined inwardly toward the front or back wall of the frame. The mirrors are positioned so that they are in opposed relationship allowing the user to view a desired scene by looking into the lower mirror. Folding the frame along two opposite longitudinal fold lines and along the transverse fold lines allows the frame to be collapsed into a generally flat structure so that it can be placed into the pocket of a user. Two pairs of structural wings mounted at lateral portions of the end flaps are detachably connectd to the lateral walls of the frame and when so connected both hold the mirrors in the desired inclined position and prevent the frame from being folded along the longitudinal fold lines thereby prevent collapse of the periscope.

13 Claims, 2 Drawing Sheets

COLLAPSIBLE PORTABLE PERISCOPE

BACKGROUND OF THE INVENTION

1. Field of the Invention

This invention relates to periscopes and more especially to portable periscopes such as commonly used by persons in crowds desiring to look over the intervening heads of persons in the crowd at a parade, exhibition, tournament and the like. This invention is more particularly concerned with a periscope which is capable of being folded into a flat structure which is dimensionally small enough to be carried in a user's pocket prior to and after use with a minimum of disassembly.

2. Description of the Prior Art

Many sports enthusiasts prefer to go to a baseball, football or other game in person in order to enjoy the sights and sounds of a live event and to feel the excitement of the crowd. For many other and similar reasons, many people also like to go to parades or other exhibitions where they are part of a large crowd watching a particular event. However, observers who are part of a crowd at such events may have difficulty viewing the event due to the viewing obstructions of intervening heads. Many observers may become exasperated from craning their necks for a long time trying to get a good view of the event.

In order to allow people to enjoy watching such events, many types of periscopes have been marketed. Basically, such prior art periscopes have provided a certain degree of portability and have been of three basic types: foldable cardboard periscopes, telescopic periscopes and dual purpose periscopes.

An example of a foldable cardboard prior art periscope is disclosed in U.S. Pat. No. 3,357,777 to Kallio. The Kallio periscope is composed of a one piece body composed of cardboard or fiberboard having fold lines at specific locations thereon. The fold lines partially define the boundaries of body sections with a front section being offset longitudinally with a back section. This offset relationship allows mirrors to be mounted at opposing ends of the sections and parallel to each other when the body is folded along the fold lines to form a periscope frame. The body is secured together by means of a suitable adhesive so that the periscope is permanently formed. Detaching certain interlocking members of the body allows the body to be collapsed into a generally flat structure. Another example of a prior art foldable cardboard periscope is disclosed in U.S. Pat. No. 2,155,164 to Harris. The Harris periscope is similar to the Kallio periscope except that it has viewing peepholes and is provided with wings having shoulders to position the mirrors at the desired angle of inclination with respect to the main body. However, a primary disadvantage with such prior art periscopes is that when collapsed such periscopes are at their full length (in fact, they are even longer than when erect) and therefore cannot be carried in a person's pocket or purse. Thus, such prior art periscopes have only a very limited degree of portability.

An example of both a telescopic and dual purpose prior art periscope is disclosed in U.S. Pat. No. 3,014,408 to Miller. The Miller periscope is essentially composed of an inner and an outer sleeve. The inner sleeve contains the food or other suitable material. When filled with the food, the inner sleeve is slidably inserted into the open end of the outer sleeve. A flap retains the inner sleeve in the desired position within the outer sleeve. The flap also holds one of the mirrors. Although this prior art periscope has the advantage of being both a container as well as a periscope, its major disadvantage is that even in collapsed form it is nevertheless a rather bulky box type structure and thus not very convenient to carry. Moreover, the necessity of having the inner sleeve slidable within the outer sleeve and the sleeves having a close tolerance fit results in a relatively expensive periscope to manufacture.

A portable periscope is thus needed that will allow the user to conveniently carry the periscope on his person or in his pocket and which is relatively inexpensive to manufacture and which can be easily deployed by the user.

SUMMARY OF THE INVENTION

It is a principal object of the invention to provide a periscope which can be conveniently carried by the user.

It is an object of the invention to provide a periscope which can be conveniently carried in the pocket of the user.

It is an object of the invention to provide a periscope which can be collapsed with a minimum amount of effort.

It is an object of the invention to provide a periscope which can be easily erected into operable form by the user.

It is another object of the invention to provide a periscope which can formed from a single blank adaptable for mass production, at relatively lost cost.

It yet another object of the invention to provide a periscope which can effectively eliminate the need for glass mirrors.

The periscope of the present invention is specifically designed to allow it to be collapsed into a flat, dimensionally small form which can be personally carried in the coat, shirt or pants pocket of the user, or simply carried in the user's hand. An important feature of the invention is that the periscope can be folded and collapsed flat simply by detaching two pairs of wing members from the lateral walls of the periscope. Conversely, securement of the wing members to the lateral walls keeps the periscope in a desired erect and operable position.

Basically, the invention includes a plastic or cardboard blank which is provided with both longitudinal and transverse fold lines. The longitudinal lines allow the blank to be folded inwardly into a tubular frame by simply gluing peripheral lateral end portions of the blank together.

A pair of end flaps are mounted on end portions of the frame, and mirrors are secured thereon. One of the end flaps is mounted on the back wall of the frame and the other end flap is mounted on the front wall at the opposite end of the frame. The end flaps are rotatable relative to the front and back walls to allow the position parallel to each other and in the proper or desired position relative to the periscope frame so that the user can obtain the desired view (when looking through the periscope). Upper wings connected to the upper end flaps and lower wings connected to the lower end flaps at lateral portions thereof are detachably connected to the lateral walls by hook and loop connection means, i.e. VELCRO ®(trademark of Velcro Industries B.V.) or SCOTCH MATE ®(a trademark of 3M Corp.) pads. The pads are large enough to allow the connection of the wings to the lateral walls at a range of points within suitably large sized areas on the lateral walls so that the end flaps may be positioned within a range of angles of inclination relative to the front and back walls. Thus, the pads allow the mirrors to be secured within a range of positions of inclination, relative to the front and back walls. Snap type fasteners may be used also. Securement of the end flaps to the lateral walls while the end flaps are at an inclined angle relative to the front and back walls prevents the frame from being appreciably folded (and thus collapsed generally flat) along the opposite longitudinal fold lines due to its structural rigidity and due to its connections to the lateral walls and to the respective front and back walls along the entire widths thereof. In this regard, securement of the end flaps to the lateral walls prevents folding of the frame along the longitudinal fold lines more specifically because such folding would tend to distort the geometric shape of the end flap, tear the end flap apart or tear it loose from the frame body.

When the frame is folded along the longitudinal fold lines, it can be folded along the transverse fold lines into a collapsed, generally flat structure. In this collapsed form, the periscope is dimensionally small enough to be a very compact structure and easily portable. If the fold lines are suitably spaced and located, the collapsed periscope can be made dimensionally small enough to fit within a coat, shirt or pants pocket. The periscope can thus be conveniently carried within a pocket of the user thereby providing a very practical portable personal periscope which can be very easily and unobtrusively carried to sports events, parades, etc. Alternatively, the periscope can be provided with a small carrying case of bag so that it can be hand carried when collapsed.

It is also important to note that only the wings need be detached from the main frame in order to collapse the frame into a generally flat structure. Thus, the periscope can be easily collapsed by simply pulling apart the pads. This allows the user to quickly, simply and conveniently manually collapse the periscope after use without any special tools whatsoever and without requiring a high degree of manual dexterity.

DETAILED DESCRIPTION OF THE PREFERRED EMBODIMENT

Figure 1:
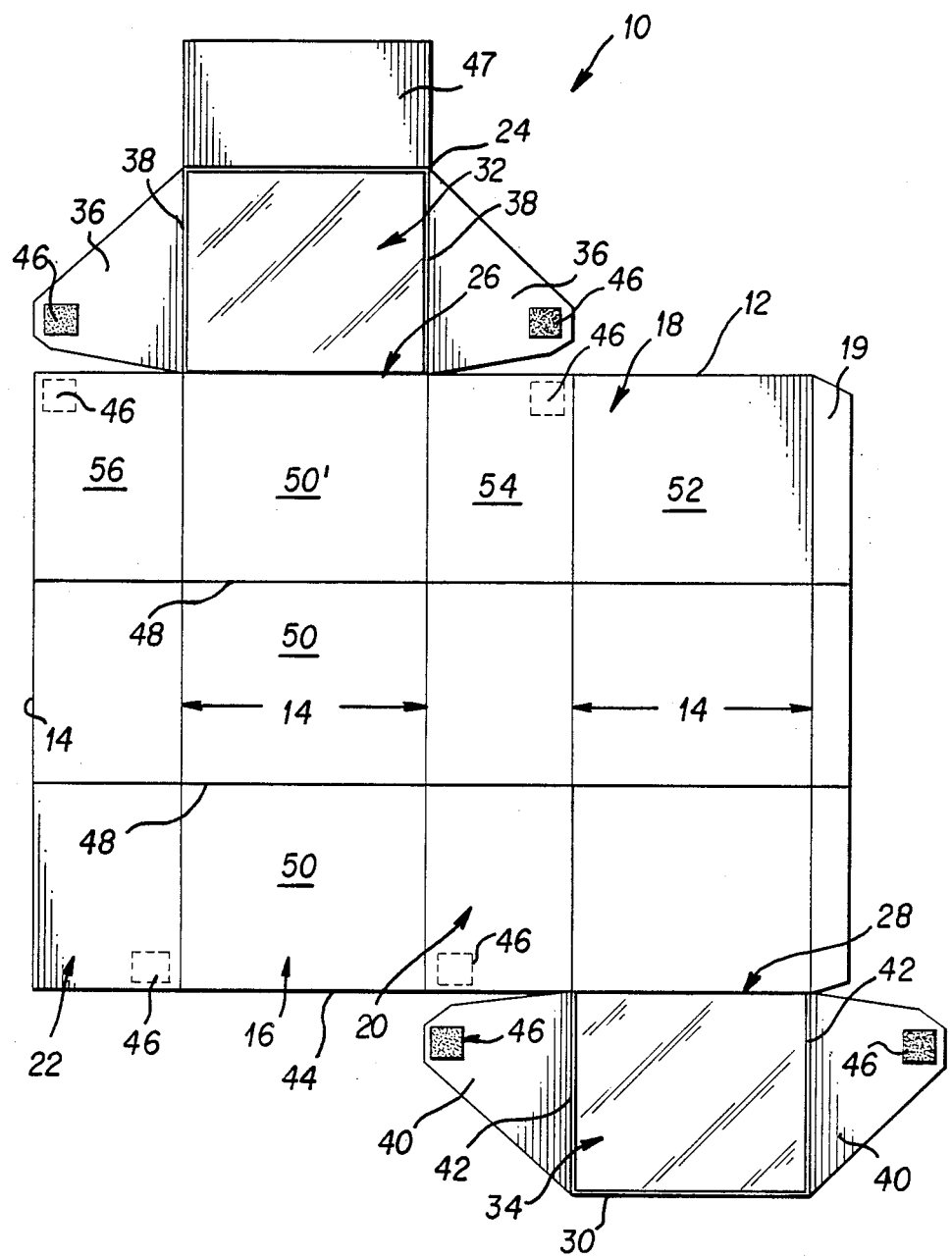
FIG. 1 is a plan view of a blank used to form the periscope of the present invention.

Referring to the drawings, the periscope of the present invention is generally designated by the numeral 10. The periscope 10 is made from an elongated blank or body 12 (preferably one piece).

As shown in FIG. 1, body 12 is scored, creased or otherwise provided with longitudinal fold lines 14 which divide the body 12 longitudinally into a front wall 16, a back wall 18, a seam flap or tab 19 and lateral walls 20 and 22.

On the longitudinal upper end of front wall 16 is an upper end flap 24 defined by score line 26. On the longitudinal lower end of back wall 18 and defined by score line 28 is lower end flap 30. Upper mirror 32 is mounted on upper end flap 24 preferably by means of an adhesive. Lower mirror 34 is mounted on lower end flap 30 also preferably by means of an adhesive. However, mirrors 32 and 34 may also be mounted on their respective end flaps by an other suitable means and may be removably mounted thereon if desired. Alternatively, mirrors 32 and 34 may be integral with their respective end flaps 24 and 30. Upper wings 36 are at lateral ends of upper end flap 24 and are defined by score lines 38. Similarly, lower wings 40 are at lateral ends of lower end flap 30 and defined by score lines 42. Score lines 38 and 42 allow wings 36 and 40 to rotate relative to their respective end flaps 24 and 30 and about the score lines 38 and 42. The functional purpose of wings 36 and 40 will be described in detail hereinbelow.

Figure 2:
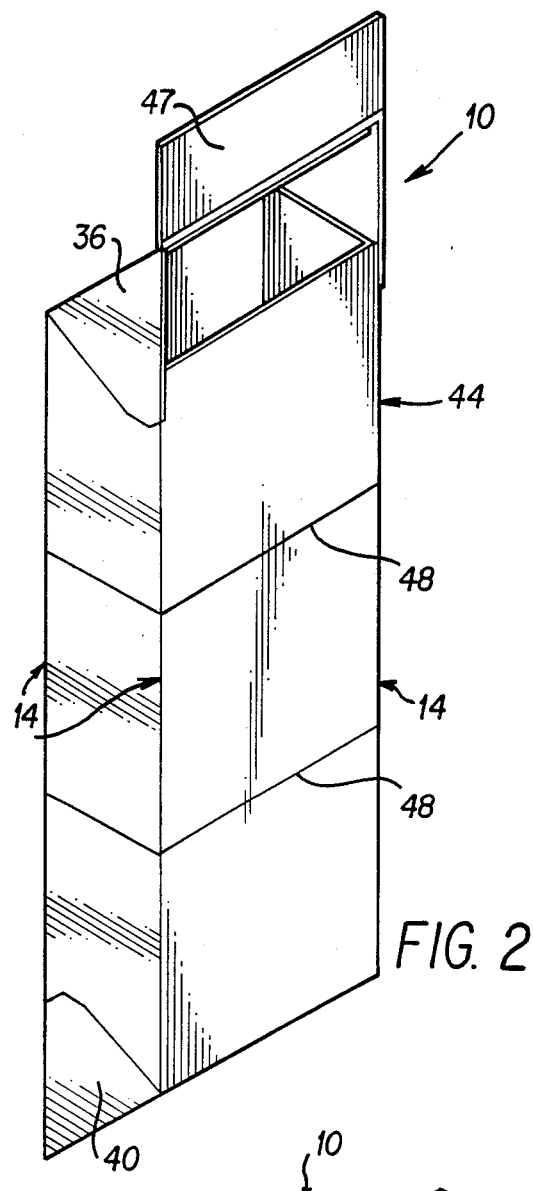
FIG. 2 is a perspective view of the assembled, erect periscope of the present invention.
Figure 3:
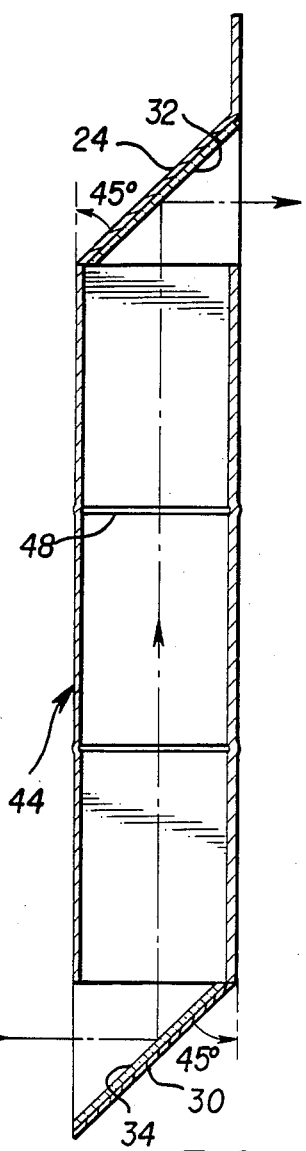
FIG. 3 is a longitudinal cross sectional view of the assembled, erect periscope of the present invention.

Fold lines 14 allow body 12 to be folded longitudinally and inwardly along longitudinal fold lines 14 to form a periscope frame 44 having preferably a rectangular cross section, as shown in FIG. 2, and end flap 19 overlying (or underlying) the adjacent lateral end of longitudinal wall 12 is glued or otherwise secured thereto. Upper end flap 24 and lower end flap 30 are rotated about their respective score lines (relative to front and back walls 16 and 18) so that they are generally parallel to each other and preferably positioned across the axis of frame 44 in order that mirrors 32 and 34 be in the proper viewing position. Preferably, upper end flap 24 is positioned at an approximately 45° angle relative to back wall 18. Once the flaps 24 and 30 are at their desired positions, wings 36 and 40 are rotated relative to their respective end flaps 24 and 30 about their respective score lines 38 and 42 until overlying the adjacent end portions of longitudinal walls 20 and 22 and detachably connected thereto. Preferably, a hook/loop type of connection means such as VELCRO ® or SCOTCH MATE ® pads 46 are provided on end portions of longitudinal walls 20 and 22, and VELCRO ® pads 46 are provided on corresponding end portions of wings 36 and 40 in order to detachably secure wings 36 and 40 to their corresponding lateral walls. Preferably, wings 36 and 40 are composed of a generally rigid material to provide enhanced rigidity to the erect periscope frame so that frame 44 can retain its desired erect position.

If desired, the inner surfaces of the periscope frame 44 may be provided with a flat black coating to enhance viewing through the periscope. In use, the periscope frame 44 is preferably held so that the user is looking into the lower mirror, and top flap 47 may be folded over its upper end flap 24 and in front of the upper mirror 32 to act as a sun block.

Figure 4:
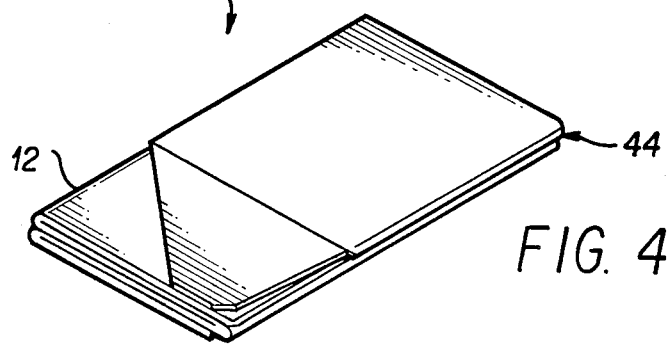
FIG. 4 is a perspective view of the assembled periscope collapsed for portability.

Transverse fold lines 48 are also provided on body 12 in order to allow the frame 44 to be collapsed. Transverse fold lines 48 also divide front wall 16 into front wall sections 50, back wall 18 into sections 52, longitudinal wall 20 into lateral wall sections 54 and longitudinal wall 22 into lateral wall sections 56. After detachment of wings 36 and 40, the frame 44 is folded flat along longitudinal fold lines 14 by pressing the frame 44 inwardly at oppositely disposed *longitudinal* fold lines 14. After folding the frame 44 in this manner, the frame 44 is folded along transverse fold lines 48 to collapse the frame 44 into a generally flat and dimensionally relatively small structure, as shown in FIG. 4. The collapsed periscope is thus in a very compact and thus more portable form.

Transverse fold lines 48 and/or longitudinal fold lines 14 may be spaced apart specific distances selected so that sections 50, 52, 54 and 56 are dimensioned such that the collapsed periscope 10 is of a dimensional size to fit within a user's shirt, coat, or pants pocket or the like. Since only one dimensional of the size (i.e., length or width) of the collapsed periscope frame 44 may be crucial in making it generally of a size to fit within a user's pocket because another end of the periscope may acceptably extend out of the pocket, only one of the transverse or longitudinal fold lines need be selectively spaced. Consequently, the other set of fold lines can have more latitude in its spacing.

Additionally, it is preferable that the sections 50 be of approximately equal size, sections 52 be of approximately equal size, section 54 be of approximately equal size and sections 56 be of approximately equal size so that the frame 44 can more easily be collapsed into a more compact form. Also, it is preferable that the body 12 be composed of cardboard or plastic which is preferably relatively thin yet substantially rigid so that the frame 44 can be collapsed into a relatively thin and flat portable structure for enhanced compactness. It is also preferable that the transverse fold lines 48 (and to a lesser extent longitudinal fold lines 14) be wide relative to the thickness of the body 12 so that the frame 44 can be collapsed more easily and readily into a thin, generally flat structure.

Preferably, the mirror is comprised of 0.040" to 0.051" standard gage, mill rolled finish, medium to high strength aluminum alloy applied to a thin, pressure sensitive polyester, acrylic or other type of foil which has been coated with aluminum, silver or other suitable metallic finish, such as by the vacuum deposition process. Suitable smooth steel, such as stainless steel, could be used in lieu of the aluminum alloy to provide even greater thinness (i.e., approximately 0.030). Alternatively, thicker plastic material, such as polycarbonate or phenolic and fiber laminate, may be used as the substrate for the vacuum coated film. If acrylic or polycarbonate is used, a thickness of approximately 0.100" to 0.125" would be preferred. If a phenolic laminate or a glass fiber/epoxy laminate is used, a thickness of approximately 0.070" to 0.090" would be preferred. These thickness would provide rigidity without brittleness. Also, the vacuum coated metallic film backed by the suggested materials listed above will provide a desirable flat, distortion-free reflective surface.

Accordingly, there has been provided, in accordance with the invention, a collapsible, portable periscope which can be conveniently carried on the person of a user when not in use that fully satisfies the objectives set forth above. It is to be understood that all the terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention as set forth in the claims hereinbelow.

What is claimed is:

1. A periscope comprising:

an elongated body having longitudinal fold lines, said body being foldable along said fold lines so that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back wall, said upper end flap rotatable relative to said front wall and said lower end flap rotatable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls, said upper means for detachably connecting have sufficient latitude to allow said upper wings to be connected to said lateral walls within sufficiently large locational areas thereof to provide said upper end flaps with a range of angular positions relative to said front and back walls;

a lower means for detachably connecting said lower wings to said lateral walls, said upper means for connecting and said lower means for connecting positioning said upper mirror and said lower mirror in generally parallel relationship so that a user can view a desired scene through said periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

2. A periscope comprising:

an elongated body having longitudinal fold lines, said body being foldable along said fold lines so that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back wall, said upper end flap rotatable relative to said front wall and said lower end flap rotable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls, said lower means for detachably connecting have sufficient latitude to allow said lower wings to be connected to said lateral walls within sufficiently large locational area thereof to provide said lower end flaps with a range of angular positions relative to said front and back walls.

3. A periscope comprising:

an elongated body having longitudinal fold lines, said body being foldable along said fold lines so that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back wall, said upper end flap rotatable relative to said front wall and said lower end flap rotable relative to said back wall, said body having upper wings at lateral portions of said upper end flap and lower wings at lateral portions of said lower end flap, said upper wings being of a length selected to allow said upper wings to overlap said lateral walls when connected thereto to a sufficient extent to provide said upper end flaps with a range of angular positions relative to said front wall, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

4. A periscope comprising:

an elongated body having longitudinal fold lines, said body being foldable along said fold lines so that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back wall, said upper end flap rotatable relative to said front wall and said lower end flap rotable relative to said back wall, said body having upper wings at lateral portions of said upper end flap and lower wings at lateral portions of said lower end flap, said lower wings being of a length selected to allow said lower wings to overlap said lateral walls when connected thereto to a sufficient extent to provide said lower end flaps with a range of angular positions relative to said back all, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame an remain erect when said upper wings are connected to said lateral walls.

5. A periscope comprising:

an elongated body having longitudinal fold lines, said body being foldable along said fold lines to that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back walls, said upper end flap rotatable relative to said front wall and said lower end flap rotable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat, said transverse fold lines being spaced apart a distance selected to allow the frame to be collapsed generally flat by folding along said transverse fold lines and along opposing longitudinal fold lines into a dimensional size which can allow the frame when collapsed to fit within an approximately standard sized pocket of the user;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

6. A periscope comprising:

an elongated body having longitudinal fold lines, said body being foldable along said fold lines so that said peripheral portions of said body are joinable together to form a tubular frame having generally rectangular cross section when erect, said tubular frame having a front wall, a back wall and lateral walls, said body having an upper end flap at an upper end of said front wall and a lower end flap at a lower end of said back wall, said longitudinal fold lines being spaced apart a distance selected to allow the frame to be collapsed generally flat by folding along said transverse fold lines and along opposing said longitudinal fold lines into a dimensional size which can allow the frame when collapsed to fit within an approximately standard sized pocket for the user, said upper end flap rotatable relative to said front wall and said lower end flap rotable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

7. A periscope comprising;

an elongated body having longitudinal fold lines, said body being foldable along said fold lines so that said peripheral portions of said body are joinable together to form a tubular frame having generally rectangular cross section when erect, said, a back wall and lateral walls, said body having an upper end flap at an upper and of said front wall and a lower end flap at a lower end of said back wall, said upper end flap rotatable relative to said front wall and said lower end flap rotatable relative to said back wall, said body having upper wings at lateral portions of said upper end flap and lower wings at lateral portions of said lower end flaps, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls, said upper means for detachably connecting includes a first set of pairs of hook and loop type connecting pads, a first individual one of said first set of pairs of pads mounted on an inner surface of one of said upper wings a second individual one of said first set of pads mounted on a corresponding adjacent outer surface of said lateral walls, said first individual one being securable with said second individual one, a third individual one of said first set of pads mounted on an inner surface of another of said upper wings, a fourth individual one of said first set of pads mounted on a corresponding adjacent outer surface of said lateral walls, said third individual one being securable with said fourth individual one;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

8. A periscope comprising:

an elongated body having longitudinal fold lines, said body being foldable along said fold lines so that said peripheral portions of said body are joinable together to form a tubular frame having generally rectangular cross section when erect, said, a back wall and lateral walls, said body having an upper end flap at an upper and of said front wall and a lower end flap at a lower end of said back walls, said upper end flap rotatable relative to said front wall and said lower end flap rotatable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper mans for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connecting to said lateral walls, and further wherein said lower means for detachably connecting includes a second set of pairs of hood and loop type connecting pads, a first individual one of said second set of pairs of pads mounted on an inner surface of one of said lower wings, a second individual one of said second set of pads mounted on a corresponding adjacent outer surface of said lateral walls, said first individual one being securable with said second individual one, a third individual one of said second set of pads mounted on an inner surface of another of said upper wings, a fourth individual one of said second set of pads mounted on a corresponding adjacent outer surface of said lateral walls, said third individual one being securable with said fourth individual one.

9. A periscope comprising:

an elongated body having longitudinal fold lines, said body being foldable along said fold lines so that said peripheral portions of said body are joinable together to form a tubular frame having generally rectangular cross section when erect, said, a back wall and lateral walls, said body having an upper end flap at an upper and of said front wall and a lower end flap at a lower end of said back wall, said upper end flap rotatable relative to said front wall and said lower end flap rotatable relative to said back wall, said body having upper wings at lateral portions of said upper end flap and lower wings at lateral portions of said lower end flap, said body having transverse fold lines allowing said frame to be folded along said transverse fold lines so that said frame can be collapsed generally flat;

an upper mirror mounted on an inner surface of said upper flap;

a lower mirror mounted on an inner surface of said lower flap, at least one of said upper mirror and said lower mirror being comprised of a reflective metallic finish applied to a substrate;

a foil upon which said metallic finish is coated, said foil applied to said substrate;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

10. A periscope comprising:

an elongated body having longitudinal fold lines, said body being foldable along said fold lines so that said peripheral portions of said body are joinable together to form a tubular frame having generally rectangular cross section when erect, said, a back wall and lateral walls, said body having an upper end flap at an upper and of said front wall and a lower end flap at a lower end of said back wall, said upper end flap rotatable relative to said front wall and said lower end flap rotatable relative to said back wall, said body having upper wings at lateral portions of said upper end flap and lower wings at lateral portions of said lower end flap, said body having transverse fold lines allowing said frame to be folded along said transverse fold lines sot that said frame can be collapsed generally flat;

an upper mirror mounted on an inner surface of said upper flap;

a lower mirror mounted on an inner surface of said lower flap, at least one of said upper mirror and said lower mirror being comprised of a reflective metallic finish applied to a substrate, wherein at least one of said upper mirror and said lower mirror is comprised of a reflective metallic finish applied to a substrate, and said substrate being comprised of a thin sheet of an aluminum alloy;

an upper means for detachably connecting said upper wings to said lateral walls, said upper means connecting said upper wings to said lateral walls so that said upper end flap is in an angled position across the axis of said tubular frame to provide structural rigidity to said frame in order that said frame can remain erect when said upper wings are connected to said walls;

a lower means for detachably connecting said lower wings to said lateral walls, said upper means for connecting and said lower means for connecting said upper mirror and said lower mirror in generally parallel relationship so that a user can view a desired scene through the periscope, said lower means connecting said lower wings to said lateral walls so that said lower end flap is in an angled position across the axis of said tubular frame to provide structural rigidity to said frame in order that said frame can remain erect when said upper wings are connected to said lateral walls.

11. The periscope of claim 10, wherein said sheet of an aluminum alloy has a thickness ranging from approximately 0.040" to approximately 0.051".

12. The periscope of claim 10, wherein said substrate is comprised of a thin sheet of stainless steel.

13. The periscope of claim 12, wherein said sheet of stainless steel has a thickness of approximately 0.030".

* * * * *